United States Patent [19]
Kajiyama

[11] 3,890,225
[45] June 17, 1975

[54] PROCESS FOR REMOVING HEAVY METAL IONS IN WATER

[76] Inventor: Yoshiaki Kajiyama, 177 Mukonosou 2-chome, Amagasaki, Japan

[22] Filed: June 6, 1973

[21] Appl. No.: 367,357

[30] Foreign Application Priority Data
June 7, 1972 Japan.............................. 47-56658

[52] U.S. Cl.................................... 210/38; 210/32
[51] Int. Cl............................................ C02b 1/44
[58] Field of Search .................. 210/24, 30, 32, 38; 252/443, 447; 423/24, 25, 100

[56] References Cited
UNITED STATES PATENTS
1,012,467  12/1911  Spencer .............................. 423/100
2,653,089  9/1953  Brooke ................................ 210/38

FOREIGN PATENTS OR APPLICATIONS
26,094  2/1911  United Kingdom................... 210/38
222,423  9/1924  United Kingdom................... 252/443

OTHER PUBLICATIONS
Chemical Abstracts, volume 55, abstract No. 3154 b, 1961, Gorlich et al.
Chemical Abstracts, volume 65, abstract No. 9779 g, 1966, Pospelov et al.

Primary Examiner—Samih N. Zaharna
Assistant Examiner—Ivars Cintins
Attorney, Agent, or Firm—Armstrong, Nikaido & Wegner

[57] ABSTRACT

A process for the removal of ions of heavy metals such as Cu, Cd, Hg, Pb, Zn, etc. present in water by contacting industrial waste water, sewage, sludge deposits, heavy metalpolluted soil, etc. with coral fossil lime stone, ground into a suitable grain size, naturally occurring in the South Sea Islands, the Okinawas Islands, the Tokunoshima Islands, etc. which has strong power of adsorbing heavy metals in a short time by virtue of its porous surfaces.

6 Claims, 4 Drawing Figures

- ○: 0.04 g
- ◐: 0.02 g
- ◑: 0.004 g
- ●: 0.04 g 3,890,225

PROCESS FOR REMOVING HEAVY METAL IONS IN WATER

BACKGROUND OF THE INVENTION

Industrial waste water often contains heavy metal ions in high concentrations. If such waste water is allowed to flow directly into sewage or rivers, it results in water pollution and soil pollution and lowers the efficiency of sewage treatment using microorganisms in sewage treatment plants. Therefore, in order to remove heavy metal ions contained in industrial waste water, it has been common practice to filter it through ion-exchange resin, activated carbon, bone black, etc. as treating material, packed in filtering apparatus. However, since these materials are not low-priced, maintenance of waste water disposal installations requiring a considerable amount of these materials is expensive. Therefore, it is economically difficult for small and medium enterprises to set up such installations. This situation has been a cause of hindering the spread of apparatus for preventing environmental pollution.

We have found that coral fossil mainly composed of lime stone naturally occurring in an enormous amount has very good properties as an adsorbent for heavy metal ions, and the present invention discloses an effective and low-priced process for removing heavy metal ions from industrial waste water, etc. by using such coral fossil lime stone.

An object of the present invention is to provide a low-priced process for heavy metal ions contained in industrial waste water by utilizing the high adsorbing power for heavy metal ions of coral fossil lime stone.

Another object of the invention is to provide a process for removing heavy metal ions contained in sludge deposits (hedoro, commonly so called in Japan), sewage and soil by using coral fossil lime stone.

SUMMARY OF THE INVENTION

The present invention provides a process for preventing water and soil pollution wherein coral fossil lime stone mainly composed of lime stone present in the form of layers on coral reefs or lime stone having its surfaces made porous is filled in filtering apparatus as treating material. Industrial water, sewage, sludge deposits or soil polluted with heavy metals is poured into the filtering apparatus directly or with water to adsorb and remove the heavy metal ions such as Cu, Cd, Hg, Pb, Zn, etc. contained in the water.

The treating material that has adsorbed heavy metal ions may be heated to convert the metals into their oxides, or may be treated with dilute acid to liberate and recover the heavy metals. The regenerated adsorbing materials can be reused for the removal of heavy metal ions.

The adsorbed heavy metals are combined with the treating material in a stable and non-deleterious form so that they are not easily liberated under natural weather conditions such as sunshine or rain. Therefore, such treating material may be placed on the ground as bottom material for pavement or mixed with raw concrete or mortar, or used as cement material.

DETAILED DESCRIPTION OF THE INVENTION

Figure 1:
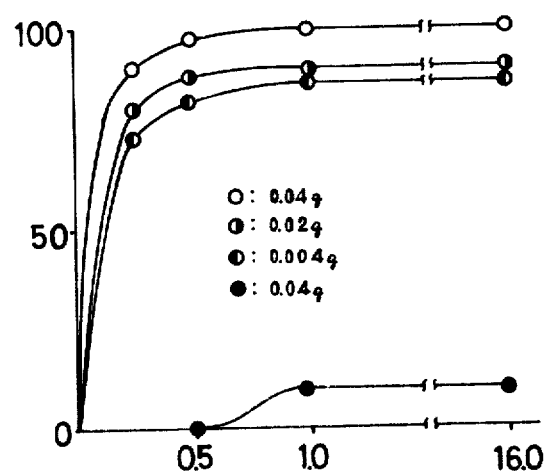
FIG. 1 is a graph showing the adsorbing ability of coral fossil lime stone in comparison with that of general lime stone produced in Japan proper.

The treating material used in the practice of the present invention is coral fossil (Loochoo coral lime stone) consisting mainly of lime stone, abundantly occurring in nature in the form of layers on the coral reefs of the South Sea Islands, the Okinawa Islands and the Tokunoshima Island, which is ground into grains of a sand-like or pebble-like size. This coral fossil is mineralogically composed of calcite containing a certain amount of aragonite and has different mineral composition from that of the lime stone of compact structure, occurring in Japan proper, composed singly of calcite. The coral fossil is formed of the remains of coral, Foraminifera, lime algae, Mollusca, etc. of the quaternary period of the geologic time, and is extremely porous in comparison with the lime stone occurring in Japan proper. We have found that the coral fossil lime stone has a high ability for the adsorption and removal of heavy metal ions and is able to adsorb cadmium, copper, mercury, etc. ions in a short time.

An example of chemical analysis of the composition of the coral fossil is shown in the following:

| Composition | Percent by weight |
|---|---|
| $CaO$ | 53.2 |
| $SiO_2$ | 2.2 |
| $Al_2O_3$ | 1.2 |
| $MgO$ | 1.2 |
| $P_2O_5$ | 0.67 |
| $Fe_2O_3$ | 0.4 |
| $SO_3$ | 0.3 |
| $Na_2O$ | 0.17 |
| $K_2O$ | 0.02 |
| Volatile matter | 42 |
| Total | 100.7 |

The adsorbing power of the coral fossil lime stone for heavy metal ions is shown in the following experiments.

EXPERIMENTAL PROCEDURE

The natural coral fossil lime stone (the treating material) was divided into 20–60 mesh sizes and the lime stone grains thus prepared were placed in 10 ml solutions, each containing ions of a different heavy metal, and the solutions were stirred for 16 hours at room temperature. For the adsorbing power for heavy metal ions, the absorbances before and after the treatment of each solution were measured by a spectrophotometer.

Experiment 1
Adsorbing power for $CuCl_2 \cdot H_2O$
(Weight unit = gram)

| Treating material | Cu compound initially contained in the solution | Cu compound remaining in the solution after treatment | Cu compound adsorbed |
|---|---|---|---|
| 0.5 | 0.60 | 0.0001 | 0.5999 |
| 0.5 | 0.80 | 0.0240 | 0.7760 |
| 0.5 | 1.00 | 0.0455 | 0.9545 |
| 1.0 | 0.75 | 0.0002 | 0.7498 |
| 1.0 | 1.00 | 0.0061 | 0.9939 |
| 1.0 | 1.50 | 0.1050 | 1.3950 |
| 0.5 | 1.0 | 0.0455 | 0.9545 |

-Continued

Experiment 1
Adsorbing power for $CuCl_2 \cdot H_2O$
(Weight unit = gram)

| Treating material | Cu compound initially contained in the solution | Cu compound remaining in the solution after treatment | Cu compound adsorbed |
|---|---|---|---|
| 1.0 | 1.0 | 0.0061 | 0.9939 |
| 1.4 | 1.0 | 0 | 1.0 |
| 2.0 | 1.0 | 0 | 1.0 |

To prepare the solutions for the quantitative determination of Cu, the potassium rhodanide method was used.

Experiment 2
Adsorbing power for $CdCl_2 \cdot 2½H_2O$
(Weight unit = gram)

| Treating material | Cd compound initially contained in the solution | Cd compound remaining in the solution after treatment | Cd compound adsorbed |
|---|---|---|---|
| 1.0 | 0.0010 | 0 | 0.00100 |
| 1.0 | 0.5 | 0.00110 | 0.49890 |
| 1.0 | 1.0 | 0.00130 | 0.99870 |
| 1.0 | 1.5 | 0.00138 | 1.49864 |
| 2.0 | 1.0 | 0.000825 | 0.999175 |
| 3.0 | 1.0 | 0.000750 | 0.999250 |
| 4.0 | 1.0 | 0.000510 | 0.999490 |

To prepare the solutions for quantitative determination of Cd, the dithizone method of Fischer-Leopoldi was used.

Experiment 3
Adsorbing power for $FeCl_3 \cdot 6H_2O$
(Weight unit = gram)

| Treating material | Fe compound initially contained in the solution | Fe compound remaining in the solution after treatment | Fe compound adsorbed |
|---|---|---|---|
| 0.1 | 0.0010 | 0 | 0.0010 |
| 1.0 | 0.20 | 0.00010 | 0.19990 |
| 1.0 | 0.25 | 0.00051 | 0.24949 |
| 1.0 | 0.40 | 0.04576 | 0.35424 |
| 2.0 | 0.5 | 0 | 0.5 |
| 2.0 | 0.6 | 0.00035 | 0.59965 |

To prepare the solutions for the quantitative determination of Fe, the potassium rhodanide method was used.

Experiment 4
Adsorbing power for $HgCl_2$
(Weight unit = gram)

| Treating material | Hg compound initially contained in the solution | Hg compound remaining in the solution after treatment | Hg compound adsorbed |
|---|---|---|---|
| 1.0 | 0.0010 | 0.0007 | 0.0003 |
| 1.0 | 0.0100 | 0.0014 | 0.0086 |
| 1.0 | 0.1000 | 0.0035 | 0.0965 |
| 1.0 | 0.1500 | 0.0038 | 0.1462 |
| 1.0 | 0.2500 | 0.0038 | 0.2464 |
| 2.0 | 0.2500 | 0.0030 | 0.2470 |

To prepare the solutions for the quantitative determination of Hg, the dithizone method was used.

It has been verified that when the heavy metals are sulfides, the coral fossil lime stone shows also a similar adsorbing power.

Such powerful adsorbing ability of the coral fossil lime stone is considered to result from the following facts: Firstly, the coral fossil being geologically newer than the general lime stone, its surfaces and inner parts are not so compact as the general lime stone. It is not only porous on its surfaces but also has a great number of fine pores passing throughout the whole body, so that there is a large contact area for the waste water. When the surface pores are brought into contact with the waste water, adsorption also occurs in the inner fine pores, the adsorption being, so to speak, of a volume type. Secondly, by reason of the main component being calcium carbonate ($CaCO_3$), an exchange reaction takes place replacing the calcium with heavy metal ions such as Cu, Cd, Fe, Hg, etc. ions in the waste water to convert heavy metals into their non-deleterious carbonates.

FIG. 1 shows the change of percentage adsorptive removal of cadmium ions with passage of time, when varying weights of coral fossil grains (0.04g, 0.02g, 0.004g) of 20–60 mesh are placed in 10 ml solutions, each containing 100 ppm cadmium ions, under stirring with a magnetic stirrer. For comparison, the adsorptive ability of lime stones occurring in Japan proper is also shown with black spots. The coral fossil shows extremely high adsorptive ability, the adsorption being nearly complete in 30 minutes to 1 hour.

The apparent adsorptive removal rate is increased with the decrease of the grain size of the coral fossil lime stone. This fact is certified by the following experiment wherein to obtain percentage saturated adsorptive removal higher than 99.5 percent, weights of the coral fossil lime stone required for the following grain sizes in 200 ml aqueous solutions each containing 100 ppm cadmium ions were measured.

| Grain size (mm) | Required wt. of coral fossil (g) | Adsorptive removal wt. of cadmium (g) | Adsorptive removal wt. of Cd | Weight of coral fossil |
|---|---|---|---|---|
| 0.25–0.84 | 0.4 | 0.0199 | 0.0049 | |
| 4.0–5.6 | 7.1–7.3 | 0.0199 | 0.0027–0.0028 | |
| 30 | 17.9–18.2 | 0.0199 | 0.0010–0.0011 | |

When coral fossil grains are charged into waste water, sewage, sludge deposits etc., a part of the grains tend to float on the surface of the water. To avoid such a tendency, slaked lime is advantageously added in an amount of about 10% based on the weight of the fossil. The fossil grains then sink into the water to exhibit the action effectively.

The coral fossil lime stone which has adsorbed heavy metal ions to saturation has no longer any adsorptive power. Such coral fossil lime stone should be subjected to a regeration process or disposal process. In the following a regeneration experiment is shown.

REGENERATION PROCEDURE

Two grams of the treating material (coral fossil lime stone) was added to 10 ml water containing one gram $CuCl_2.2H_2O$ to adsorb the Cu compound completely. Thereafter, the treating material was maintained at a temperature between 200° and 400°C in an electric furnace for several hours to oxidize the Cu compound. The treating material appearing to have completed regeneration was almost black. By the use of this regenerated material, an adsorption experiment was made, of which the result is shown below:

Experiment 5
Adsorptive power after regeneration
(Weight unit = gram)

| Regenerated material | Cu Compound initially contained in 10 ml water | Cu compound remaining in the water after adsorption | Adsorbed Cu compound |
| --- | --- | --- | --- |
| 1.0 | 1.0 | 0.00384 | 0.99616 |

In another regeneration, method, the lime stone having adsorbed heavy metal ions is immersed in a 1–3percent dilute hydrochloric acid for 15–30 minutes. The heavy metals are recovered as their chlorides and the lime stone, after being washed with water and dried at a temperature from 100° to 105°c for several hours, can be used again. No substantial decrease in the adsorptive power was observed.

The treating material mainly composed of calcium carbonate is converted into stable and non-deleterious heavy metal carbonates by ion-exchange reaction of calcium with heavy metal ions. Therefore, the treating material after use does not liberate the heavy metals so far as it is not heated above the decomposition temperature or is not exposed to acid having a pH below 2 so that it can be safely disposed. The treating material having adsorbed heavy metal ions settles in a sand-like form in the waste water treatment tank. After heating and drying to remove the water by evaporation, the material can be used as a basement material below concrete pavement, or after being ground into a suitable grain size, can be mixed with raw concrete or mortar, for safe disposal.

In another method, the foregoing pulverized treating material may be charged into the cement production process to convert the heavy metals into their non-deleterious oxides by the high temperature. The treating material acts almost the same as the quick lime charged as the cement material. When the surface of concrete containing such treating material having adsorbed heavy metals is coated with a water proofing material such as nylon resin, asphalt, etc., and then mortar-coated, the waste disposal can be extremely advantageously effected without giving rise to environmental pollution. Moreover, such fossil lime stone occurs in nature in an enormous amount so that it can be supplied at a low price.

In the preparation of the treating material used in the present invention, the natural coral fossil lime stone may be ground into 20–60 mesh powder or into a suitable grain size, for example, into a pebble-like size of a diameter of about 1 cm, or after being once pulverized, may be pressed into pellets of a suitable size, or of course of calcium compound may be processed so as to be porous on its surfaces and then made into grains of a suitable size.

Furthermore, the treating material may be treated in a solution of alkali such as caustic soda, or placed in a mixed solution of sodium aluminate and silica gel under stirring and then dried, thereby to cover and permeate the surface layers of the calcium material with the sodium aluminate and silica gel. By such treatment, the adsorptive as well as agglomerative power of the treating material can be further heightened.

Figure 2:
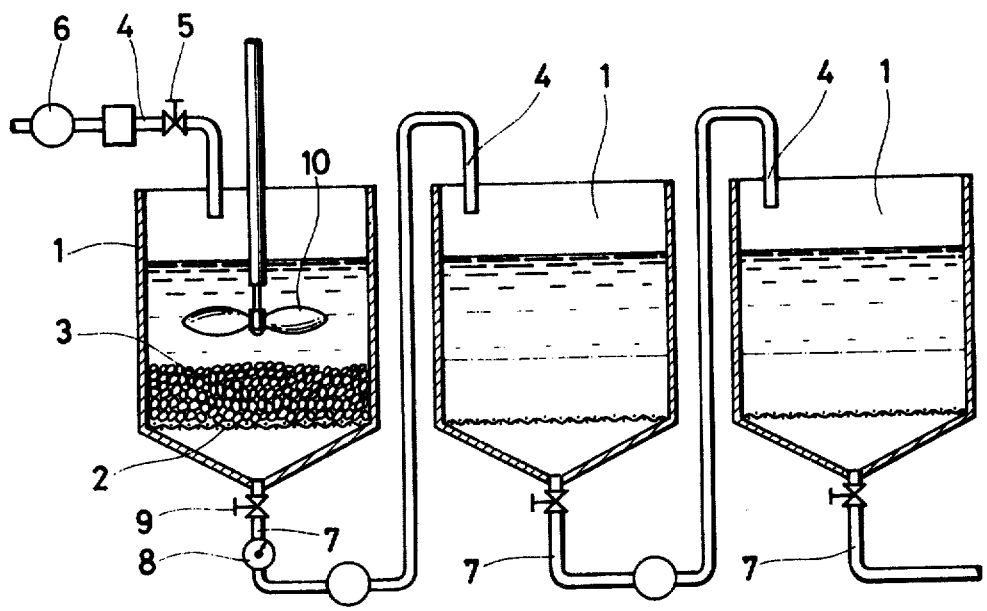
FIGS. 2, 3, and 4 are schematic diagrams showing examples of the apparatus packed with the treating material for the practice of the present invention.

FIG. 2 shows an example of the waste water disposal apparatus which utilizes the treating material of the present invention. Each of the treating tanks (1) has a filtering means (2) such as a metal net at the bottom. A suitable amount of the treating material (3) of natural coral fossil lime stone ground into 20–60 mesh pebble-like form is placed on the filtering means 2. Above each treating tank 1, a water supply pipe 4 to charge industrial waste water, sewage or a mixture of water and sludge deposits or polluted soil is provided through intermediary of an adjusting valve 5 and a pumping means 6. The bottom of the tank is connected to a drain pipe 7 equipped with an indicator for heavy metal content 8 and a control valve for filtered water 9. In the treating tank 1, there is provided a stirrer 10 to continuously stir the waste water during treatment so that the adsorptive power is not dropped by any scum or precipitates which may cover the surfaces of the treating material. This figure shows a plurality of such tanks arranged in serial connection, each tank containing treating material of a different grain size thereby to remove the heavy metals approximately completely, at high efficiency.

Figure 3:
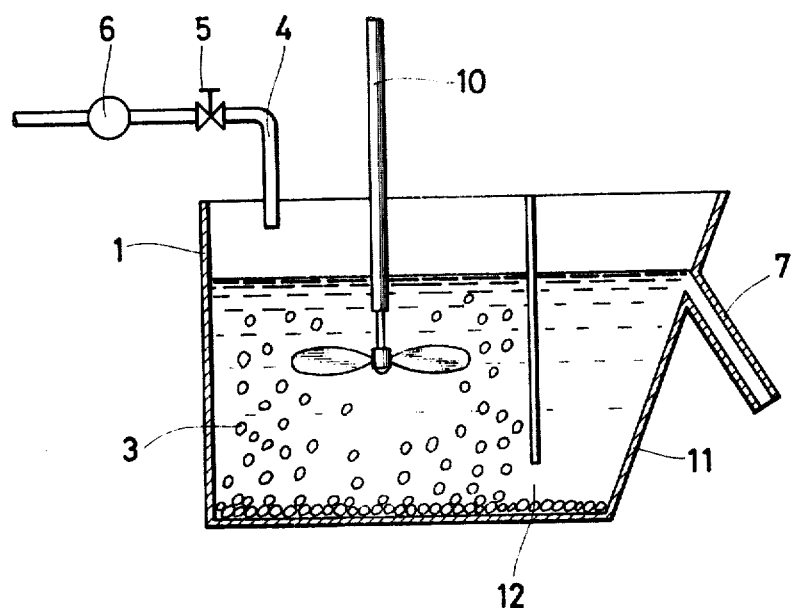

FIG. 3 shows an example of apparatus for continuous treatment of waste water, sewage, sludge deposits, etc. The treating material is placed in a stirring tank 1 equipped with a stirrer 10. In the stirring tank 10, the waste water allowed to flow through the pipe 4 is mixed with the treating material. Adjacent the stirring tank 1, a settling tank 11 is provided. Both tanks 1 and 11 communicate with each other by a communicating opening 12 at the lower part of the separating wall. The treated water is separated from the treating material and solids in the settling tank (11) and the supernatant is continuously discharged to the following step through a drain pipe 7 connected to the upper part of the settling tank (11).

Figure 4:
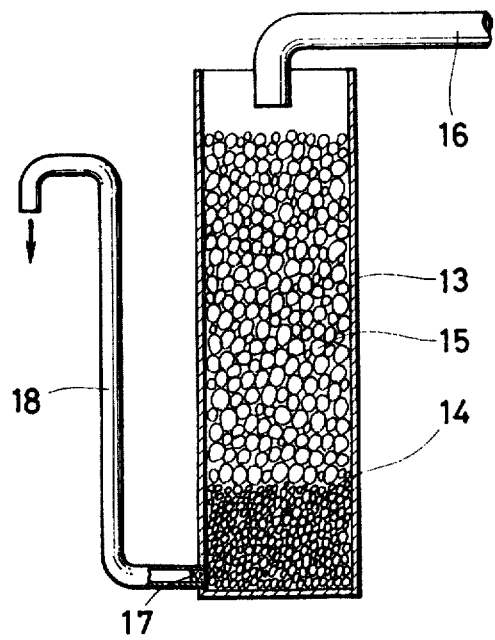

FIG. 4 shows an apparatus for treating a small amount of waste water from laboratories, etc. Even though the amount of water allowed to flow from laboratories may be small, the water frequently contains high concentration of heavy metals. To prevent the danger of flowing such water directly, a treating tube 13 is placed just before the inlet of the sewage pipe. The treating tube 13 is a circular tube made of transparent synthetic resin material. The lower part of the tube contains a layer of 5–20 mesh fine grains 14 and the upper part a layer of 3–5 mesh gross grains 15 of the coral fossil lime stone. Above the upper opening of the treating tube 13, a drain pipe 16 from the laboratory is provided. To the bottom of the treating tube 13, an outlet pipe 18 is connected through intermediary of a filter 17. The outlet pipe 18 is once bent upwardly and then connected to the sewage pipe. The heavy metal-containing waste water from the drain pipe 16 passes through the layers 14 and 15 of the treating material for a sufficiently long time. The waste water removed from heavy metal ions enters the output pipe 18 and is discharged, however only when the water level in the tube 13 exceeds the upper end of the outlet pipe 18.

Any of these apparatus exhibits very good action of removing heavy metal ions by virtue of the porous calcium material mixed with waste water.

What is claimed is:

1. A process for the removal of heavy metal ions contained in water comprising contacting coral fossil lime stone with said water containing the heavy metal ions.

2. The process as claimed in claim 1 wherein the coral fossil lime stone is mixed with slaked lime.

3. The process as claimed in claim 1 wherein the coral fossil lime stone is contacted with industrial waste water to remove heavy metal ions in the waste water.

4. The process as claimed in claim 1 wherein the coral fossil is contacted with sewage to remove heavy metal ions in the sewage.

5. The process as claimed in claim 1 wherein the coral fossil lime stone is contacted with sludge deposits containing water, to remove heavy metal ions in the water of the sludge deposits.

6. The process as claimed in claim 1 wherein the coral fossil lime stone is contacted with soil containing water to remove heavy metal ions in the water of the soil.

* * * * *